United States Patent Office 3,105,768
Patented Oct. 1, 1963

3,105,768
CRYSTALLIZATION AND FLOCCULATION-RESISTANT α-COPPER PHTHALOCYANINE PIGMENTS AND THEIR MANUFACTURE
Guenther Zwahlen, Arlesheim, Switzerland, assignor to Ciba Limited, Basel, Switzerland, a company of Switzerland
No Drawing. Filed Aug. 16, 1961, Ser. No. 131,749
Claims priority, application Switzerland Aug. 18, 1960
6 Claims. (Cl. 106—288)

It is known that of the various modifications of copper phthalocyanine the α-form has the most reddish tint and has the strongest coloring power. This α-form has, however, the disadvantage that in general it is not stable to solvents, that is to say, in the presence of many solvents customarily used in the lacquer industry, such as benzene, toluene or xylene, it changes more or less rapidly accompanied by recrystallization into the more greenish β-form, and forms large crystalline needles of the β-form, so that the pigment loses much of its coloring power and becomes practically useless.

A further disadvantage of the α-form is its considerable tendency to flocculate, that is to say, the pigment particles dispersed in a liquid agglomerate to form larger particles, and this also results in a substantial reduction in the coloring power. Various tests have been devised for determining the tendency of a pigment to flocculate. According to one method, for example, 10 parts of copper phthalocyanine and 90 parts of titanium dioxide are dispersed in an oil-modified alkyd resin, and the resulting lacquer is poured on a support. Shortly before the lacquer has dried, a portion of the coating is rubbed with the finger. If this rubbed portion appears to be more strongly colored than the non-rubbed portion of the coating, flocculation has occured.

Many attempts have been made to prepare copper phthalocyanines that are resistant to crystallization and flocculation. Thus, for example, mixtures of copper phthalocyanine and tin phthalocyanine have been used. To obtain mixtures that satisfy practical requirements with regard to resistance to crystallization and flocculation, it is necessary to add at least 12% of tin phthalocyanine calculated on the total weight of the metal phthalocyanines. Since tin phthalocyanine is considerably less fast to light than copper phthalocyanine and also has an undesirable strongly greenish blue shade, such a high proportion of tin phthalocyanine has a very unfavorable effect on the tint and fastness to light of the pigment.

It is also known to use magnesium phthalocyanine for stabilizing copper phthalocyanine, but magnesium phthalocyanine is less fast to migration and light than copper phthalocyanine, and this has an unfavorable influence on the fastness to migration of the mixture.

The present invention is based on the observation that pigments that are resistant to flocculation and crystallization, and which do not have the aforesaid disadvantages, are obtained by preparing mixtures which are composed of at least 80% of a halogen-free and/or a low halogen copper phthalocyanine, 0.5 to 10% of tin phthalocyanine and 0.5 to 10% of magnesium phthalocyanine, and may contain a small proportion of another metal phthalocyanine.

Such mixtures are advantageously composed of 90 to 95% of copper phthalocyanine and/or monochloro- or monobromophthalocyanine or a mixture of the latter, 2 to 5% of tin phthalocyanine and 2 to 5% of magnesium phthalocyanine.

A prerequisite for good resistance to crystallization and flocculation is that the ingredients must be very intimately mixed together. This is advantageously achieved by grinding the ingredients together, and it is of advantage to use as starting materials the β-forms of the metal phthalocyanines, such as are obtained by the usual methods of synthesis. It is of advantage to use a grinding method which leads directly to a highly dispersed α-form. This can be achieved by treating the crude pigments in known manner in the presence of a grinding substratum, which can easily be removed, for example, an inorganic or organic salt, such as sodium sulphate, sodium chloride or sodium acetate, in a grinding or kneading apparatus. Particularly good results have been obtained with the conditioning method described in U.S. patent application Serial No. 58,193, filed September 26, 1960, by Hans Gaertner et al., in which the pigment mixture is ground in aqueous dispersion in the presence of an organic grinding substratum which is solid under the grinding conditions and is capable of sublimation, more especially hexachlorethane, whereby after a relatively short grinding period a highly dispersed, stable α-form is obtained.

Alternatively, the ingredients may be conditioned separately by the methods referred to above and then mechanically mixed together.

Another method of obtaining a homogeneous mixture is to synthesize the mixture by heating phthalic acid derivatives capable of forming phthalocyanines with or without the aid of a nitrogen-donor, for example, phthalonitrile or phthalic anhydride or phthalimide and urea, with a mixture of salts or oxides of copper, tin and magnesium. It has been found especially advantageous to heat phthalonitrile with metallic magnesium until magnesium phthalocyanine or an intermediate thereof has formed, and then further heat the reaction mixture with salts of copper and tin. In this case the β-form is obtained, which must then be conditioned and converted into the α-form by known methods. The conversions to the α-form can be carried out, for example, by treatment with dilute sulfuric acid.

Since concentrated sulfuric acid converts magnesium phthalocyanine into metal-free phthalocyanine which has no stabilizing effect, pigment mixtures containing magnesium phthalocyanines cannot be converted to the α-modification by the usual method of dissolution and re-precipitation from concentrated sulfuric acid. It is therefore, of advantage to heat the pigment mixture for some length of time in dilute sulfuric acid of, for example, about 20% strength. Under these conditions magnesium phthalocyanine is not decomposed.

The new pigments possess a resistance to crystallization and flocculation that satisfies the most stringent demands, and they can therefore be used for all purposes for which pigments are used, and more especially in the manufacture of lacquers and spinning solutions.

In the foregoing description and in the following examples parts and percentages are by weight:

*Example 1*

A laboratory-type attritor mill was charged with 62 parts of water, 14 parts of finely powdered hexachlorethane, 64 parts of a filter cake moist with water, containing 13.16 parts of copper phthalocyanine of the α-modification, 0.42 part of dichloro-tin-phthalocyanine (SnCl$_2$—Pc; obtained by heating 59.2 parts of phthalic anhydride, 100 parts of urea, 28 parts of SnCl$_2$, 1 part of ammonium molybdate in 200 parts of trichlorobenzene for 6 hours at about 180° C. and then for another 8 hours at 220° C.) and 0.42 part of magnesium phthalocyanine dihydrate (Mg—Pc.2H$_2$O; obtained by heating 64 parts of phthalonitrile and 3.5 parts of magnesium chips for 8 hours at 290° C.).

After grinding the mixture for 24 hours the mill was discharged, rinsed with water, and the resulting suspension was freed from hexachlorethane by steam distillation. The residual aqueous pigment suspension was filtered, and the filter cake was washed with water and then dried in a vacuum cabinet at 80° C. As shown by the X-ray diffraction diagram, the resulting dry pigment was in the $\alpha$-modification. The dry pigment which can be very easily converted into a soft powder by crushing, was tested for its resistance to crystallization in the following manner:

Stage 1: 0.5 gram of the pigment was taken up in 10 cc. of xylene and heated for 30 minutes at 100° C., then cooled, filtered, washed with ethanol and dried in a vacuum cabinet at 60° C. As revealed by its X-ray diffraction diagram, the pigment mixture was still in the pure $\alpha$-modification. When subjected to the same test copper phthalocyanine of the $\alpha$-modification not containing the above stabilizing additives underwent recrystallization completely to form large needles of the $\beta$-modification.

When there was used, instead of 3% each of tin phthalocyanine and magnesium phthalocyanine, 6% of tin phthalocyanine (as is known), the above test showed that the pigment had a resistance to crystallization of only 80%.

When there was used, instead of 3% each of tin phthalocyanine and magnesium phthalocyanine, 6% of magnesium phthalocyanine (as is known), the pigment mixture crystallized completely in this test to form large needles of the $\beta$-modification.

A pigment, which remains 100% in the $\alpha$-modification during the stage 1 test, satisfies the requirements hitherto desired by industry. However, since these requirements are becoming more stringent, the pigment was subjected to the following further stages of testing:

Stage 2: 0.5 gram of the dry pigment was taken up in 10 cc. of xylene and boiled under reflux for 1 hour (132° C.). Working up and X-ray examination were carried out as described for stage 1 above. The pigment was still wholly in the $\alpha$-modification.

When there was used, instead of 3% each of tin phthalocyanine and magnesium phthalocyanine, 6% of tin phthalocyanine (as is known), the pigment mixture underwent during this test stage complete recrystallization to form large needles of the $\beta$-modification.

Stage 3: The pigment was then refluxed for 2 hours in xylene. X-ray examination showed that the product was wholly in the $\alpha$-modification.

Stage 4: The pigment was then refluxed for 4 hours in xylene. X-ray examination showed that 95% of the product was in the $\alpha$-modification.

Stage 5: The pigment was then refluxed for 5 hours in xylene. X-ray examination showed that 95% of the product was in the $\alpha$-modification.

Apart from its good resistance to crystallization this product also had a good resistance to flocculation.

Example 2

A laboratory-type attritor mill was charged with 112 parts of water, 14 parts of finely powdered hexachlorethane, 13.16 parts of crude $\beta$-copper phthalocyanine, 0.42 part of $SnCl_2$—Pc and 0.42 part of Mg—Pc.$2H_2O$.

After having ground the mixture for 72 hours at 15–20° C., the needles of the starting pigment, which were originally 100 to 200$\mu$ long, had disappeared completely. The dyestuff had been taken up by the hexa-chlorethane in a very fine state of dispersion, and at the same time it had been converted from the $\beta$-modification to the $\alpha$-modification, as was shown by the X-ray diffraction diagram. The mill was then discharged and the aqueous suspension was worked up as described in Example 1. The resulting pigment mixture was tested for its resistance to crystallization as described in Example 1. The following are the results of X-ray examinations of the product at the various test stages:

Stage 1: 100% $\alpha$-modification
Stage 2: 100% $\alpha$-modification
Stage 3: 100% $\alpha$-modification
Stage 4: 100% $\alpha$-modification The pigment was also very resistant to flocculation.

Example 3

A mixture of 120 parts of finely ground sodium chloride, 28.2 parts of $\alpha$-copper phthalocyanine, 0.9 part of $Sn(OH)_2$—Pc (obtained by boiling $SnCl_2$—Pc in ammonia), 0.9 part of Mg—Pc.$2H_2O$ and 50 parts of isopropanol was kneaded in a laboratory-type kneader for 24 hours, while cooling. The kneaded mass was then taken up in 1 liter of hot water, stirred for 1 hour, then filtered and washed with water until it was free from chlorine ions. The filter cake was dried in a vacuum cabinet at 60° C., and the resulting pigment was tested for its resistance to crystallization as described in Example 1. X-ray examination at stage 1 showed the product to consist wholly of the $\alpha$-modification.

Example 4

A mixture of 120 parts of finely powdered sodium chloride, 28.5 parts of $\beta$-copper phthalocyanine, 0.9 part of $Sn(OH)_2$—Pc, 0.9 part of Mg—Pc.$2H_2O$ and 50 parts of isopropanol was kneaded in a laboratory-type kneader until the $\beta$-modification of copper phthalocyanine had been completely converted into the $\alpha$-modification. The kneaded mass was then further treated as described in Example 3, and the resulting pigment was tested for its resistance to crystallization. X-ray examination of the product showed it to consist wholly of the $\alpha$-modification at stage 1.

Example 5

A mixture of 84 parts of phthalonitrile and 0.25 part of magnesium chips was stirred at 290° C. until the magnesium has been completely dissolved. The whole was then cooled to about 180° C., 1.9 parts of $SnCl_2$ and 8.9 parts of CuCl were added to the reaction mixture, and the whole was heated for a further 5 hours at 240° C. The solidified reaction product was disintegrated, repeatedly boiled in trichlorobenzene, and filtered. The filter residue was washed with ethanol, and then boiled first in dilute hydrochloric acid and then in ammonia solution. The mixture was filtered, and the filter cake is washed until the washings were neutral, and dried in a vacuum cabinet at 80° C. Yield: about 90% of the theoretical yield.

The resulting pigment was in the $\beta$-modification and contained about 86.5% of CuPc, about 10.6% of SnPc and about 2.9% of MgPc.

14 parts of the resulting mixed pigment were converted into the $\alpha$-modification by grinding for 72 hours in a laboratory-type attritor mill at 15 to 20° C. with 14 parts of finely powdered hexachlorethane and 112 parts of water. The mill was then discharged, rinsed with water, and the resulting suspension was filtered. The washed filter cake was heated in a vacuum cabinet to 100° C. whereby at first predominantly the water and then the hexachlorethane were removed almost completely. The resulting dry pigment in the $\alpha$-modification was tested for its resistance to crystallization as described in Example 1. The X-ray examination of the pigment at stage 1 showed that it consisted wholly of the $\alpha$-modification.

Example 6

A mixture of 64 parts of phthalonitrile and 0.25 part of magnesium chips was stirred at 290° C. until the magnesium had completely dissolved. The solution was then cooled to about 180° C., 100 cc. of trichlorobenzene, 1 gram of anhydrous stannous chloride and 9.4 grams of cuprous chloride, were added to the reaction mass, and the whole was then stirred for 18 hours at 170 to 180° C. The reaction mixture was filtered, while still hot, and the filter residue was washed with hot trichlorobenzene and then with ethanol, and boiled first in dilute hydrochloric acid and then in dilute ammonia solution. The whole was filtered, and the filter cake was washed until the washings were neutral, and then dried in a vacuum cabinet at 80° C.

Yield: about 60% of the theoretical yield.

The resulting pigment was in the β-modification and contained about 94.0% of CuPc, about 5.3% of MgPc and about 0.7% of SnPc.

This crude pigment was converted into a relatively stable α-modification by grinding it with a substratum as described in Example 5.

X-ray examination at stage 1 showed 95% in the α-modification (after grinding for 120 hours).

Example 7

A mixture was prepared from:

3.58 parts of the mixed pigment of Example 5
5.97 parts of the mixed pigment of Example 6 and
4.45 parts of β-copper phthalocyanine
14.00 parts of pigment mixture containing 3.0% each of MgPc and SnPc This pigment mixture was ground with 14 parts of finely powdered $C_2Cl_6$ and 112 parts of water in an attritor mill for 96 hours at 18° C., and then worked up as described in the foregoing examples.

Stability at stage 1: 100% α-modification.

Example 8

As concentrated sulfuric acid converts magnesium phthalocyanine into metal-free phthalocyanine, which has no stabilizing effect, pigment mixtures that contain MgPc cannot be converted into the α-modification by dissolution or swelling in and precipitation from sulfuric acid. On the other hand, the conversion can be achieved in dilute sulfuric acid, it being of advantage, before the conversion, finely to disperse the pigment by a known method, in order to obtain a finely divided end product:

14 parts of the mixed pigment obtained as described in Example 5 were ground in a laboratory type of attritor mill with 14 parts of finely powdered hexachlorethane and 112 parts of water for 24 hours at 45° C., whereby the crude pigment used was taken up by the hexachlorethane in a state of very fine dispersion.

The mill was then emptied, rinsed with water, and the resulting suspension was freed from hexachlorethane by steam distillation.

The residual pigment suspension was filtered, and the filter residue was washed with water and dried in a vacuum cabinet at 80° C.

From its X-ray diffraction diagram the pigment mixture was found to be wholly in the β-modification.

5 parts of this finely ground pigment were stirred in 100 parts of sulfuric acid of 22% strength for 10 to 15 hours at 85 to 90° C.

After 10 hours, 70% of the pigment had undergone conversion into the α-modification. The acid suspension was filtered, and the filter cake is washed with water until the washings were neutral and then dried in a vacuum cabinet at 60° C.

The mixed pigment, of which 70% was in the form of the α-modification, was tested for its resistance to crystallization, and it was found that the portion in the α-modification was stable.

X-ray analysis:
 Stage 1—70% of the α-modification.
 Stage 2—70% of the α-modification.

Example 9

A laboratory-type attritor mill was charged with 56 parts of water, 14 parts of finely powdered hexachlorethane, 70 parts of a water-moist filter cake containing 13.16 parts of monochloro-copper phthalocyanine in the α-modification (the α-modification was obtained by dissolving crude β-monochloro-copper phthalocyanine in concentrated sulfuric acid and pouring the solution into ice-water), 0.42 part of $Sn(OH)_2$—Pc and 0.42 part of $MgPc.2H_2O$. After grinding the mixture for 48 hours at 17° C., the mill was discharged, and the product was further worked up as described in Example 1.

Stability achieved: Stage 1—90% of the α-modification.

What is claimed is:

1. α-Copper phthalocyanine pigment that is resistent to crystallization and flocculation, which is composed of a very intimate mixture of at least 80% of a member selected from the group consisting of copper phthalocyanine, mono halogen copper phthalocyanine and a mixture of these two components, 0.5 to 10% of tin phthalocyanine and 0.5 to 10% of magnesium phthalocyanine.

2. α-Copper phthalocyanine as claimed in claim 1, which consists of 90 to 95% of copper phthalocyanine, 2–5% of tin phthalocyanine and 2 to 5% of magnesium phthalocyanine.

3. α-Copper phthalocyanine as claimed in claim 1, which consists of about 94% of copper phthalocyanine, about 3% of tin phthalocyanine and about 3% of magnesium phthalocyanine.

4. A process for the manufacture of α-copper phthalocyanine claimed in claim 1, wherein the metal phthalocyanines are mixed together, and are brought into a state of fine subdivision not later than during the mixing operation.

5. A process for the manufacture of α-copper phthalocyanine which does not crystallize or flocculate from organic diluents, wherein at least 80 to 95 parts of a member selected from the group consisting of copper phthalocyanine, mono halogen copper phthalocyanine and a mixture of these two components, 0.5 to 10 parts of tin phthalocyanine and 0.5 to 10 parts of magnesium phthalocyanine are mixed together, and the metal phthalocyanines are brought into a state of fine subdivision not later than during the mixing operation.

6. A process as claimed in claim 4, wherein the metal phthalocyanines are ground in aqueous suspension in the presence of hexachlorethane, and then the water and hexachlorethane are removed from the ground mass.

References Cited in the file of this patent

UNITED STATES PATENTS

| | | |
|---|---|---|
| 2,476,951 | Beard | July 26, 1949 |
| 2,713,005 | Bavnsgaard et al. | July 12, 1955 |
| 2,891,964 | Roberts | June 23, 1959 |

FOREIGN PATENTS

| | | |
|---|---|---|
| 551,607 | Canada | Jan. 14, 1958 |